United States Patent

Murayama et al.

[11] Patent Number: 5,978,506
[45] Date of Patent: Nov. 2, 1999

[54] COLORANT-INDEPENDENT COLOR BALANCING METHODS AND SYSTEMS

[75] Inventors: Noboru Murayama, Tokyo; Shigeki Oouchi, Kanagawa; Kiyoshi Suzuki, Tokyo; Kouichi Suzuki, Kanagawa, all of Japan

[73] Assignee: Ricoh & Company, Ltd., Japan

[21] Appl. No.: 08/775,020

[22] Filed: Dec. 27, 1996

[30] Foreign Application Priority Data

Dec. 28, 1995 [JP] Japan ..................... 7-343939
Dec. 28, 1995 [JP] Japan ..................... 7-343940
Dec. 28, 1995 [JP] Japan ..................... 7-344215

[51] Int. Cl.⁶ .................................................. G06K 9/00
[52] U.S. Cl. ........................... 382/162; 358/517; 358/530
[58] Field of Search .................... 358/504, 518, 358/520, 516, 530, 533, 517; 382/167, 162

[56] References Cited

U.S. PATENT DOCUMENTS 4,500,919  2/1985  Schreiber ................... 358/78
4,590,515  5/1986  Wellendorf ................. 358/75
4,841,360  6/1989  Birgmeir ................... 358/80
4,845,550  7/1989  Urabe et al. .............. 358/80
4,962,421  10/1990 Murai ....................... 358/76

FOREIGN PATENT DOCUMENTS 0 144 188 A2  6/1985  European Pat. Off. .
2-76760       3/1990  Japan .
4-277974      10/1992 Japan .
WO 88/04503   6/1988  WIPO .

OTHER PUBLICATIONS

"Color Image Correction with Conditional Polynomial," by Ohta and Murayama, *ITE Technical Report*, vol. 20, No. 54, pp. 7–12 no date avail.

Primary Examiner—Jerome Grant, II
Attorney, Agent, or Firm—Knoble & Yoshida LLC

[57] ABSTRACT

The current invention generally discloses a method of and a system for color balancing colorants independent of their colorant composition ratios over an output intensity range.

40 Claims, 15 Drawing Sheets c,d=-6~6;  c=±3sqr(3), d=-c

COLORANT-INDEPENDENT COLOR BALANCING METHODS AND SYSTEMS

FIELD OF THE INVENTION

The current invention is generally related to correcting a color image output, and more particularly related to a method of and a system for color balancing each of color components of a color output independent of the colorant such as toner and ink.

BACKGROUND OF THE INVENTION

In order to output a color image on an image-carrying medium such as a sheet of paper, color-rendering material or colorant such as toner or ink is generally applied onto the image-carrying medium such as a white image-carrying medium. For a human to perceive the rendered color image, light must be shined towards the image carrying-medium. Since more light is absorbed by the applied colorant than the white image-carrying medium, the light reflected from the applied colorant is perceived as a color. Because of this absorbing nature, the above color-rendering process is known as a "subtract," and subtractive primary colors include cyan (C), magenta (M), yellow (Y) and black (K). For example, using color toner, a particular mixture of four substantially distinct primary color toner (i.e., CMYK toner) renders a desired color. In contrast to the above described subtractive system, the additive primary colors such as red (R), green (G) and blue (B) are used to generate an image while generating light such as a television screen or cathode ray tube (CRT).

To duplicate a color image, the color image is generally scanned into RGB data via an input device and converted into CMYK data for an output device. For example, color copiers have an input device such as a scanner for scanning a color image before reproducing the color image on an image-carrying medium via an output device such as a printer. To convert the RGB scanned data into the CMY data, the scanner must be calibrated to produce R=G=B=1 for a standard white color and R=G=B=0 for a standard black color. In addition, the scanner must be also balanced for any achromatic gray input to generate R=G=B. Under the above described conditions, the RGB data is converted to the CMY data based upon the following relations:

$$1-R=C_p \quad (1)$$

$$1-G=M_p \quad (2)$$

$$1-B=Y_p \quad (3)$$

where $C_p$, $M_p$ and $Y_p$ are respectively ideal pure cyan, magenta and yellow toner. As briefly noted above, the CMYK data has four separate values including a C value, a M value, a Y value and a K value for each pixel in the output image. Although the four separate values respectively specify an intensity or an amount of colorant for each pure primary color to achieve a desirable color on an image-carrying medium, the precise mixture of the primary colorant is more complicated than these CMYK values indicate for the following reasons.

Each primary colorant is not generally pure and includes other primary colorants. For example, referring to FIG. 1, cyan toner includes not only cyan color component but also some magenta and yellow color componet. The X axis indicates an output intensity level which specifies the amount of the cyan toner to be outputted from an output device to an image-carrying medium. The output intensity level is also known as a printer command intensity value for a particular primary color. The Y axis indicates a measured separate CMY color component levels of the outputted cyan toner which is measured by an input device such as a scanner. The composition of the CMY primary colors varies over the output intensity range. In other words, referring to FIG. 2, the composition of the cyan toner is shown over the same intensity value range when the cyan component of the cyan toner is used as a standard value of 1. The yellow and magenta components of the cyan toner is expressed with respect to the above standard value.

Referring to FIG. 3, the composition of magenta toner is illustrated in a similar fashion as the cyan toner. Magenta toner includes not only magenta toner but also yellow color component as well as cyan color component, and the composition of the CMY primary toner varies over the output intensity range. Referring to FIG. 4, the composition of yellow toner is illustrated in a similar fashion as other primary color toner. Although the yellow toner is substantially more pure than magenta and cyan toner, it still includes some magenta and cyan, and the composition of CMY toner also varies over the output intensity range.

Referring to FIG. 5, in order to render a desirable color, the above described CMY toner are superimposed. The colorant composition of the above described superimposed CMY toner also varies over an intensity range. Because each of the CMY toner is impure, the combined composition ratio of the superimposed or mixed CMY toner is not substantially identical among the three colorant components. Furthermore, the degree of the above described impurity of toner varies among manufacturers, toner products and even lots within the same product. Lastly, the relative composition of the toner may be unstable over an extended period.

The above described factors make it difficult to duplicate a consistently faithful color image using the colorant such as CMYK toner. To render a faithful color image, prior art attempts include various ways to manually adjust the CMYK intensity values based upon the observations of output images. These prior attempts using manual adjustments are disclosed in the following U.S. Pat. Nos.: 4,500,919 for adjusting a color development system using a CRT; 4,590,515 for increasing black toner in proportion to a reduced amount of CMY ink; 4,841,360 for adjusting based upon an image-carrying medium; and 4,845,550 for using six color signals to adjust coefficients for performing a color correction. The above prior attempts are generally imprecise and require operators some special training in color adjustments. Because of the above described non-uniform toner characteristics, even the experienced operators are not able to fully correct the problems.

To correct the color output in a more systematic and precise manner, other prior attempts include automatic adjustments. Japanese Patent 4-277974 discloses a method and a system for automatically adjusting the magenta value and the yellow value for the corresponding cyan value based upon the use of the gray scale. Furthermore, Japanese Patent 2-76760 also discloses a method and a system for automatically adjusting the output CMYK values based the input values of a predetermined gray scale chart which have been printed by an output device and read by an input device of the system to be adjusted.

Despite these efforts, none of the above described prior art addresses the problems associated with the impure primary colorant in color balancing. In other words, the above described prior art assumes that the colorant is substantially pure and color outputs are not affected by the impure nature of the colorant. Furthermore, because the colorant has the above described non-uniform composition over the intensity range, prior art does not effectively correct the color output intensity values for specifying a mixture of the CMYK rendering material.

SUMMARY OF THE INVENTION

To solve the above and other problems, according to one aspect of the current invention, a preferred method of color balancing a color image output on an image-carrying medium, the color image output being generated by colorants each respectively rendering a predetermined primary color, at least a first colorant being placed over a second colorant on the image-carrying medium, each of the colorants being a mixture of the colorants, includes the steps of: a) approximating a standard gray scale value for one of the colorants based upon a predetermined inverse function at a specified intensity, said one of the colorants being defined as a standard colorant; b) determining a masking factor of said standard colorant for each of other colorants, said masking factor indicating an amount of masking by said standard colorant which effects said other colorants located beneath said standard colorant in the color image output on the image-carrying medium; and c) determining a gray scale correction factor for each of said other colorants based upon said corresponding masking factor and said approximated gray scale value, said gray scale correction factor indicating an amount for adjusting each of said other colorants so as to converge on said standard gray scale value whereby the color image output is color balanced at said specified value.

According to a second aspect of the current invention, a method of manually color balancing a color image output of an image-duplicating device, the color image output being generated by colorants each respectively rendering a predetermined color, at least a first colorant being placed over a second colorant on an image-carrying medium, each of the colorants being a mixture of the colorants, includes the steps of: a) selecting a color balancing mode to cause the image-duplicating device to generate on the image-carrying medium a predetermined test pattern output which includes an orientation mark for indicating a predetermined orientation of said predetermined test pattern output; b) placing said predetermined test pattern output on a predetermined image scanning surface according to said orientation mark; and c) activating an automatic color balancing process, wherein said automatic color balancing process color balances the colorants on the image-carrying medium.

According to a third aspect of the current invention, a method of automatically color balancing a color image output of an image-duplicating device, the color output being generated by colorants each respectively rendering a predetermined primary color, at least a first colorant being placed over a second colorant on an image-carrying medium, each of the colorants being a mixture of the colorants, includes the steps of: a) automatically activating a color balancing mode to cause the image-duplicating device to generate a predetermined test pattern output on the image-carrying medium; b) scanning said predetermined test pattern output on the image-carrying medium inside the image-duplicating device prior to dispensing the image-carrying medium, said step b) generating a scanned test pattern signal; and c) performing a color balancing process on the colorants based upon said scanned test pattern signal.

According to a fourth aspect of the current invention, a system for color balancing a color image output on an image-carrying medium, the color image output being generated by colorants each respectively rendering a predetermined primary color, at least a first colorant being placed over a second colorant on the image-carrying medium, each of the colorants being a mixture of the colorants, includes: a standard gray scale value approximating unit for approximating a standard gray scale value for one of the colorants based upon a predetermined inverse function at a specified intensity, said one of the colorants being defined as a standard primary colorant; a masking value determining unit for determining a masking factor of said standard colorant for each of said other colorants, said masking factor indicating an amount of masking by said standard colorant which effects said other colorants located beneath said standard colorant in the color image output on the image-carrying medium; and a correction factor determining unit for determining a gray scale correction factor for each of said other colorants based upon said masking factor and said approximated gray scale value for color balancing said other primary colorants, said gray scale correction factor indicating an amount for adjusting each of said other colorants so as to converge on said standard gray scale value whereby the color image output is color balanced at said specified value.

According to a fifth aspect of the current invention, a system for manually color balancing a color image output of an image-duplicating device, the color image output being generated by colorants each respectively rendering a predetermined primary color, at least a first colorant being placed over a second primary colorant on an image-carrying medium, each of the colorants being a mixture of the colorants, includes: a manual mode switch for selecting a color balancing mode; a test pattern generating unit connected to said mode switch for generating on the image-carrying medium a predetermined test pattern output which includes an orientation mark for indicating a predetermined orientation; an image scanning surface for scanning said predetermined test pattern output according to said predetermined orientation as indicated by said orientation mark; a color balance activation switch for activating an automatic color balancing process; and a color balancing unit connected to said color balance activation switch for color balancing the colorants on the image-carrying medium.

According to a sixth aspect of the current invention, a system for automatically color balancing a color image output of an image-duplicating device, the color image output being generated by colorants each respectively rendering a predetermined primary color, at least a first colorant being placed over a second colorant on an image-carrying medium, each of the primary colorants being a mixture of the colorants, including: an off color balance detection unit for automatically detecting an off color balance status and for activating a color balancing mode; a test pattern generating unit connected to said off color balance detection unit for generating a predetermined test pattern output on the image-carrying medium; a first scanner for scanning said predetermined test pattern output on the image-carrying medium inside the image-duplicating device prior to dispensing the image-carrying medium, said first scanner generating a scanned test pattern signal; and a color balancing unit connected to said first scanner for performing a color balancing process on the colorants based upon said scanned test pattern signal.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 6:
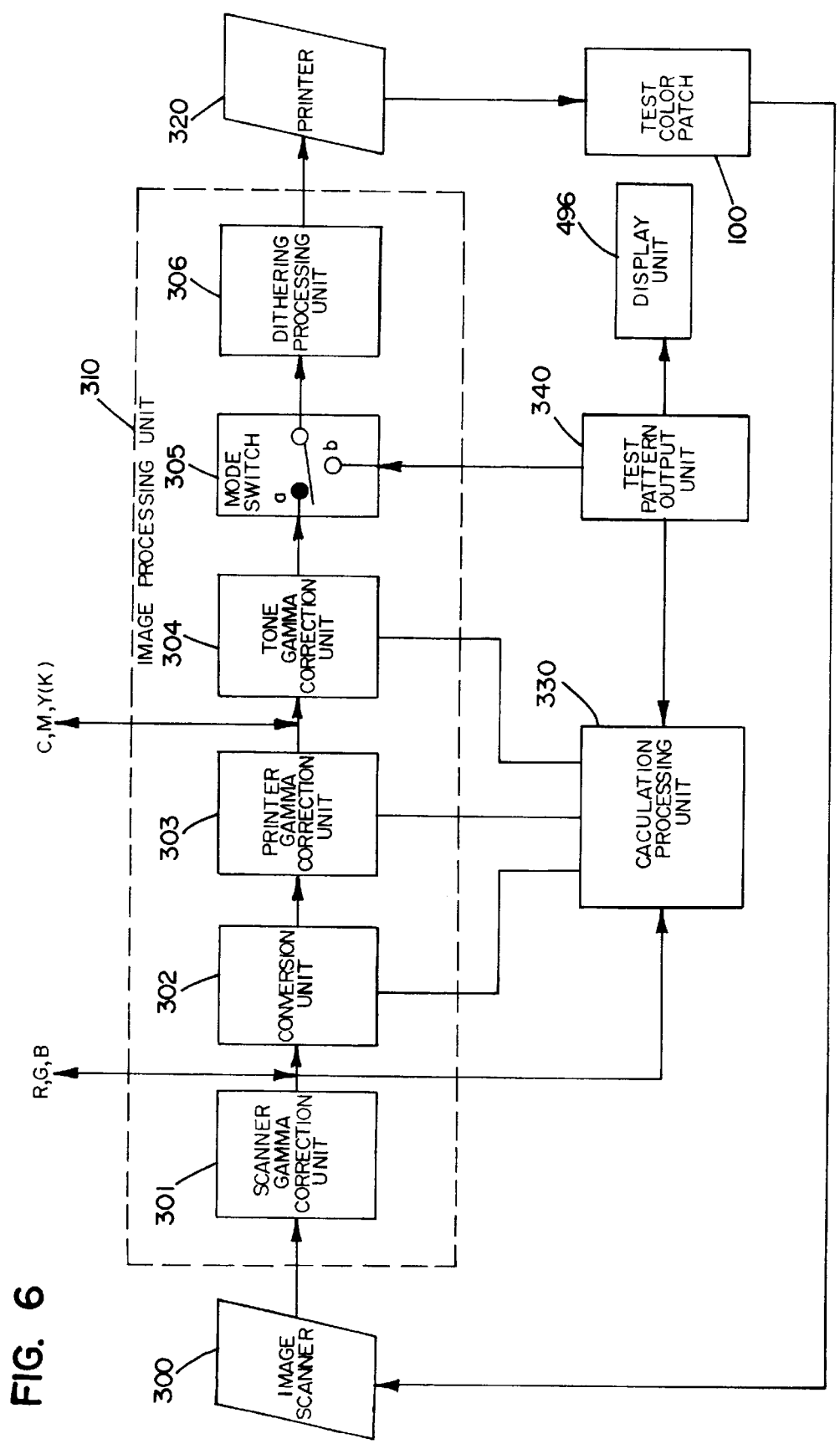
FIG. 6 is a block diagram for illustrating one embodiment of the colorant-independent color balancing system according to the current invention.

Referring now to the drawings, wherein like reference numerals designate corresponding structure throughout the views, and referring in particular to FIG. 6, one preferred embodiment of the colorant-independent color balancing system is illustrated. During a normal copying operation, a mode switch 305 in an image processing unit 310 is selected to a normal duplication mode and contacts a terminal "a." In general, the image processing unit 310 processes an original image which is inputted by an image scanner 300 in order to output a duplicated image by a printer 320 in the following manner. The image scanner 300 scans the original image and converts into a RGB signal. The converted RGB signal undergoes a gamma correction in a scanner gamma correction unit 301 to adjust the gray scale balance. A conversion unit 302 converts the gray scale balanced RGB signal into a CMY signal, and a printer gamma correction unit 303 adjusts the gray scale balance of the CMY signal. Subsequently, a tone or gradation gamma correction unit 304 adjusts certain tonal aspect of the CMY signal, but the adjustment by the tonal gamma correction unit 304 is not limited to the tonal adjustment. Lastly, a dithering process unit 306 outputs a printer command signal based upon a predetermined dither table which converts the CMY signal into the printer command signal for driving the printer 320. The dithering process unit 306 is not necessary to practice the current invention. In addition, both the RGB and CMY signals are available via a predetermined interface to the image processing unit 310 as indicated by the corresponding arrow.

The calculation processing unit 330 dynamically sets parameters for the above described processing units based upon the output characteristics of a printer 320 and the scanner 300. For example, the calculation processing unit 330 dynamically sets a desirable dynamic range of the CMY value for each colorant prior to the conversion of the RGB signal into the CMY signal, and the conversion unit 302 converts the gray scale balanced RGE signal into a CMY signal within the dynamic range. In determining the dynamic range, the saturated CMY values are avoided, but a unsaturated CMY range is maximally used.

Still referring to FIG. 6, in contrast to the above described normal duplicating operation, during a color-balancing mode, the mode switch 305 in the image processing unit 310 is to be selected to a color-balancing mode. When the mode switch 305 contacts a terminal "b," a color patch or test pattern output unit 340 is activated to cause the printer 320 to generate a test pattern output or color patch 100. After the test color patch 100 is outputted, an operator manually places the generated test pattern output 100 onto an image scanning surface of the image scanner 300 at a substantially predetermined position and at a substantially predetermined angle. The image scanner 300 scans the test pattern output 100 and inputs the scanned RGB signal into the image processing unit 310. The activated color patch pattern output unit 340 also sends a predetermined parameter signal to the calculation processing unit 330 so that certain components of the image processing unit 310 receive certain predetermined parameters for processing the scanned RGB signal of the known test pattern output 100. The parameter signal includes parameters such as a toner intensity value and a gray scale correction factor for each of the CMY toner outputted on the test pattern output 100. The image processing unit 310 processes the test pattern output 100 during the color balancing process based upon the above parameter signals so as to adjust the correction characteristics of certain correction units such as the conversion unit 302, the printer gamma correction unit 303, and the tone gamma correction unit 304.

In addition, the test pattern output unit 340 is connected to a display unit 496. Although it is not shown in FIG. 6, upon receiving a condition signal for commencing a color balancing process, the test pattern output unit 340 not only causes a printer 320 to print the test pattern output 100, but also controls the display unit 496 for displaying information on the color balancing process to an operator. Information initially indicates that the color balancing process needs to be run and subsequently displays a step-by-step instruction to complete the color balancing process.

Figure 7:
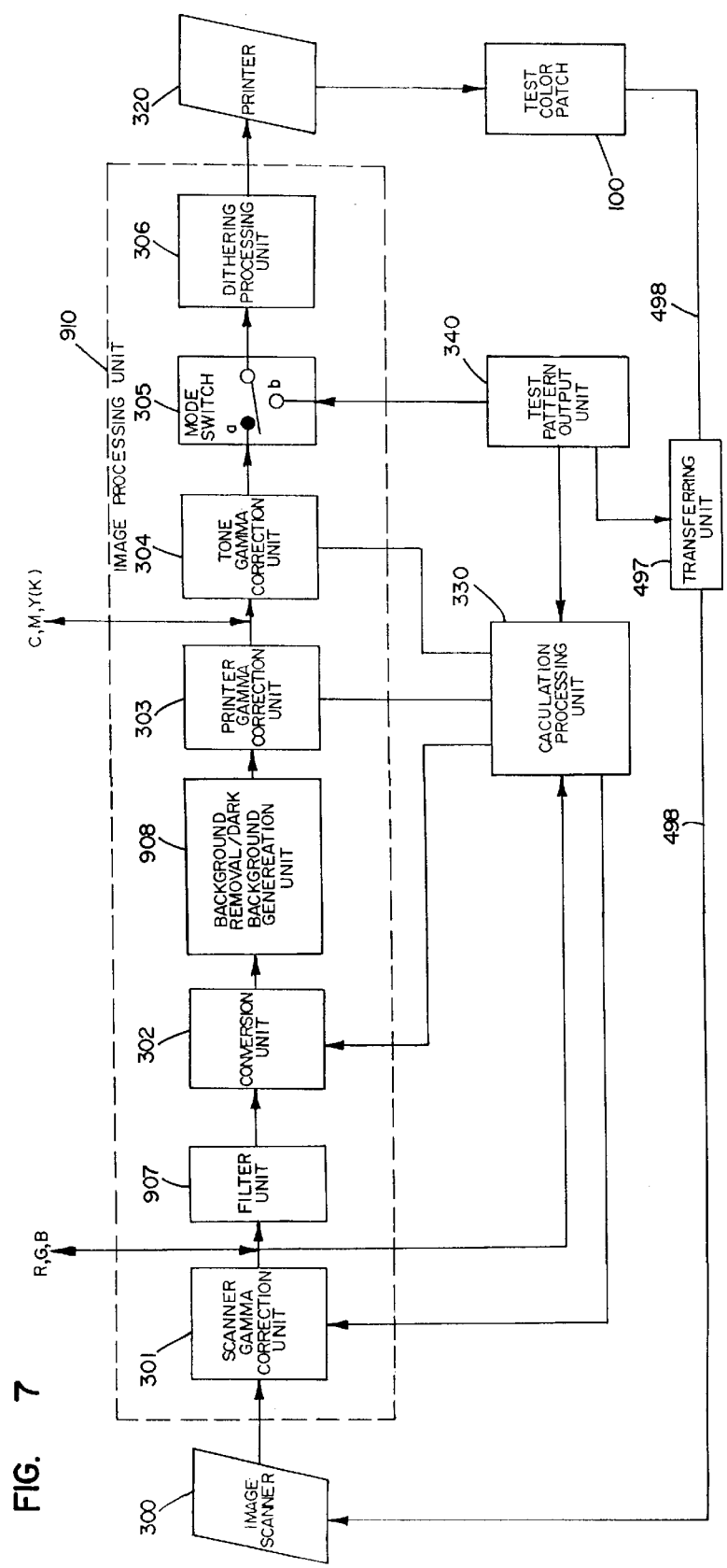
FIG. 7 is a block diagram for illustrating a second embodiment of the colorant-independent color balancing system according to the current invention.

Referring to FIG. 7, a second preferred embodiment of the colorant-independent color balancing system according to the current invention includes additional processing components in the processing unit 910. In general, a filter unit 907 allows more flexible processing while a background removal/dark background generation unit allows a four-colorant process. Because of the above described additional component in the image processing unit 910, for example, a scanner gamma correction curve may be adjusted based upon K or black toner portion of the output test pattern patch. Another additional component is a under color/background color removal (UCR) and black/dark background generation (BG) unit 908 for preventing the black output intensity value from being reduced and also avoid the use of unstable mixed color areas at a high output intensity value. For the under color removal, the least value U among the output intensity values $C_p$, $M_p$ and $Y_p$ as shown in the equations (1)–(3) is selected, and a parameter n is also used. The value of the parameter n is empirically determined. After the under color removal step, $C_p$ - nU, $M_p$ - nU and $Y_p$ nU will be color balanced. For the BG process, K=nU is used, but generally the black toner has its specific gamma correction curve.

Still referring to FIG. 7, a test pattern image-carrying medium transferring unit 497 transfers the test pattern output 100 in response to the test pattern output unit 340 towards the image scanner 300 via a transfer path 498 and places the test pattern output 100 on the image scanning surface. This automatic placement arrangement substantially eliminates misplacement of the test pattern output 100 which leads to inaccurate scanned data. According to an alternative embodiment, a mode switch 305 is automatically selected to activate the color-balancing process when a predetermined number of duplications is made during a normal duplication mode.

Figure 8:
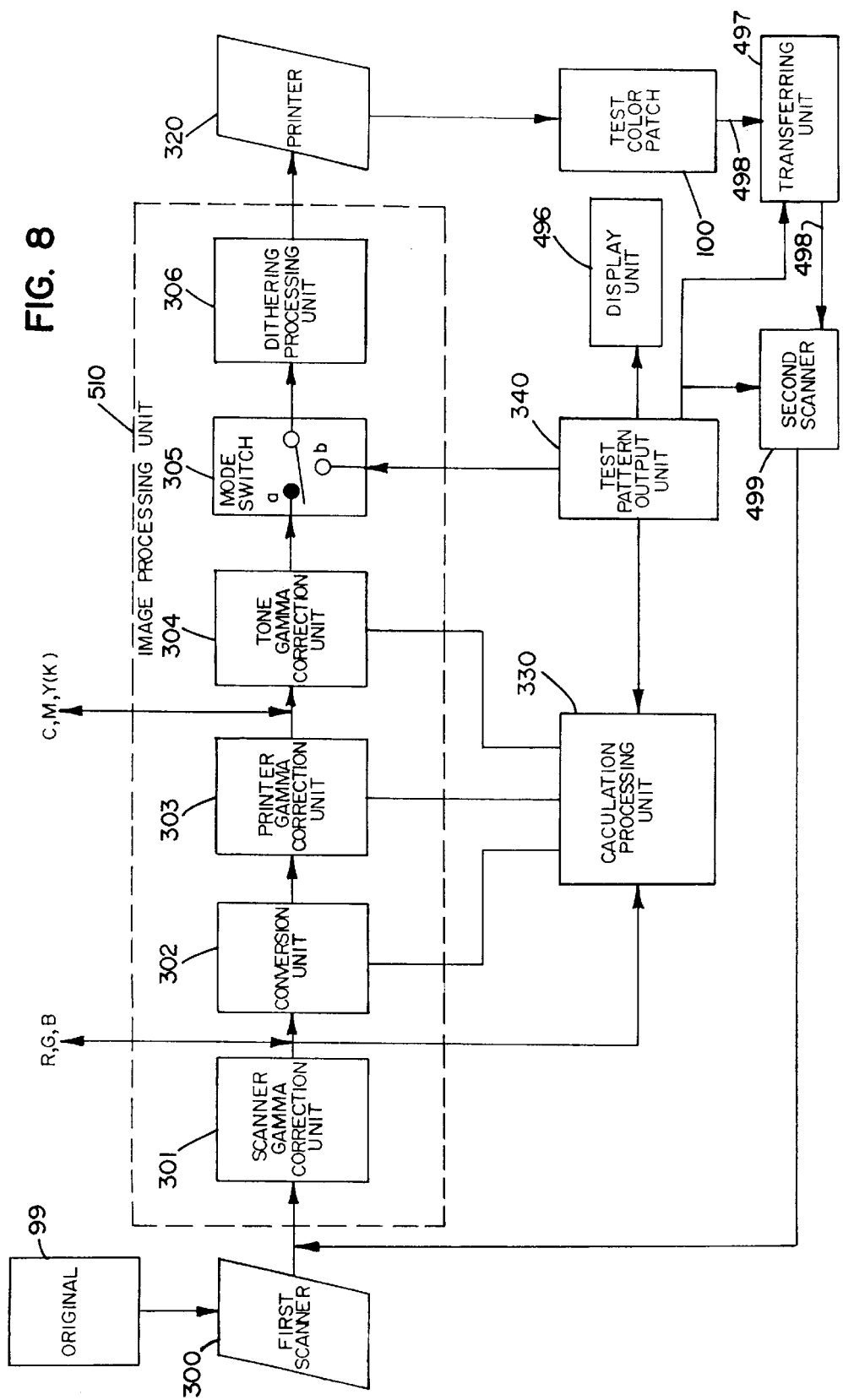
FIG. 8 is a block diagram for illustrating an alternative embodiment of the colorant-independent color balancing system according to the current invention.

Referring to FIG. 8, a third preferred embodiment of the colorant-independent color balancing system according to the current invention includes a substantially identical image processing unit 510 to one in the above described first and second preferred embodiments. The descriptions of the components 300 through 306, 320 and 330 are incorporated herein from those from FIG. 6 and not repeated here. The third preferred embodiment further includes a second image scanner 499 in addition to a first image scanner 300. During a normal image duplicating mode, an original image 99 is scanned by the first image scanner 300 in order to duplicate the original image 99. In contrast, during the color balancing mode, the test pattern output 100 is scanned by the second scanner 499 which is independent from the first image scanner 300. The test pattern output 100 is placed on a second image scanning surface of the second image scanner 499. To transport the test pattern output 100 to the second image scanning surface, a test pattern image-carrying medium transferring unit 497 transfers the test pattern output 100 towards the second image scanner 499 via a transfer path 498. After the second image scanner 499 scans the test pattern output 100, the scanned signal is outputted to the image processing unit 510 for the purpose of color balancing.

A test pattern output unit 340 in the third preferred embodiment is connected to the second scanner 499, a display unit as well as the transferring unit 497. Although it is not shown in FIG. 8, upon receiving a condition signal for commencing a color balancing process, the test pattern output unit 340 not only causes a printer 320 to print the test pattern output 100, but also activates the transferring unit 497 and the second scanner. In addition, the test pattern output unit 340 also controls a display unit 496 for displaying information on the color balancing process to an operator.

Still referring to FIG. 8, in comparison to an embodiment with a single scanner, the third preferred embodiment with the two image scanners 300 and 499 allows a practical solution for automatically scanning the test pattern output without an operator intervention. For example, a second image scanner is located near an output path 498 of a printer 320, and in response to the test pattern output unit 340, the test pattern image-carrying medium transferring unit 497 automatically transfers the test pattern output 100 over a short distance in the transfer path 498 and accurately places the test pattern output 100 on the second image scanning surface. As a result, the placement errors are substantially eliminated, and the second image scanner generates accurate data to be used by the image processing unit 510 for color balancing. On the other hand, since the two separate image scanners are used, the input characteristics of the two image scanners have to be calibrated.

Figure 9:
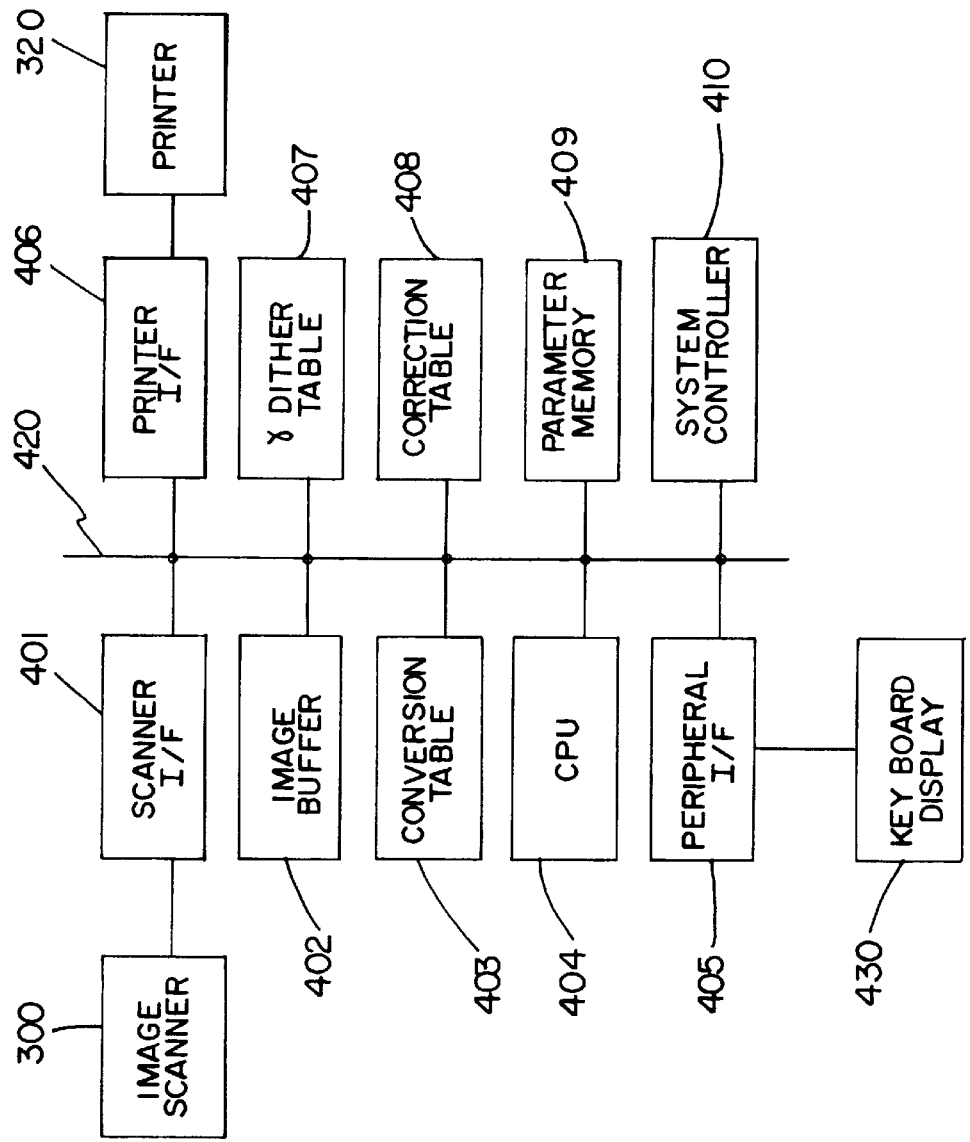
FIG. 9 is a block diagram for illustrating some detail input/output components of an image processing unit of the colorant-independent color balancing system according to the current invention.

Referring to FIG. 9, some additional input and output components of an image-processing unit of the current invention are illustrated. A scanner is connected to other components by a bus 420 via a scanner interface (I/F) unit 401. A printer 320 is also connected to other components by the bus 420 via a printer interface (I/F) unit 406. Other peripherals such as a keyboard or a display 430 is connected to other components by the bus 420 via a peripheral interface (I/F) unit 405. An image buffer 402 temporarily stores scanned image data from an original image including a test pattern patch. To efficiently convert the stored image data into colorant intensity data, the conversion is accomplished by a conversion table rather than calculation on the fly. The conversion table is generated based upon parameter values which satisfy the color balancing requirement. Furthermore, in order to accommodate multiple dithering patterns, a plurality of conversion tables is also generated. In order to accommodate multiple output modes, a plurality of dithering tables 407 are prepared. A gamma correction table 408 stores certain correction data for the above described conversion based upon a gamma correction curve for correcting tonal as well as chromatic aspects of the image data. A parameter memory 409 stores parameter values used for the generation of the above described tables. A central processing unit (CPU) 404 is used to generate the above described tables while a system controller 410 is used to coordinate the activities of other components.

Figure 10A:
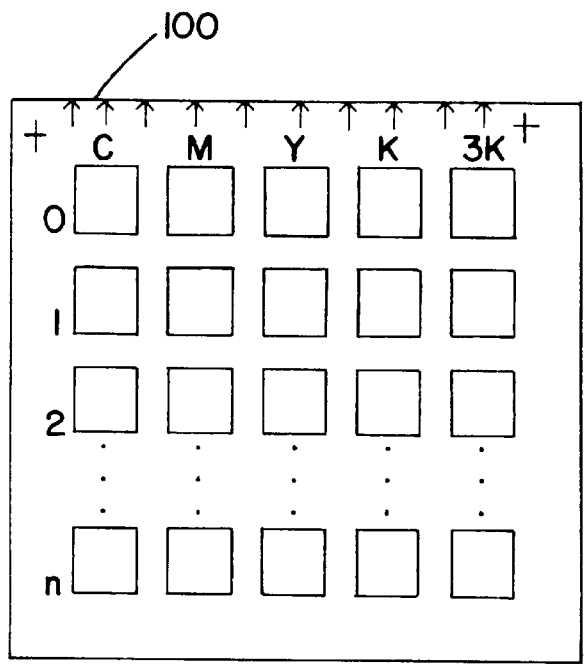
FIGS. 10A and 10B respectively illustrate two embodiments of a test pattern output including orientation marks according to the current invention.

Now referring to FIG. 10A, one preferred embodiment of the test pattern output or color patch 100 according to the current invention has rows of patches for each colorant including cyan (C), magenta (M), yellow (Y), black (K) and triple layered application (3 K) of the CMY toner. Each numbered row (0 through n) of the patches is generated in response to predetermined output intensity levels such as 8, 16, 32, 48, 64, 96, 128 and 255. In addition, the test pattern output 100 further includes at least an orientation mark such as an arrow to indicate a predetermined orientation of the test pattern output 100 with respect to an image scanning surface of an image input device. The test pattern output 100 also includes a position marker such as a plus sign to indicate a predetermined absolute position with respect to the patches. These markers facilitate the operator to place the test pattern output 100 on the image scanning surface at the predetermined orientation and position so as to generate a desirable scanned RGB signal.

Figure 10B:
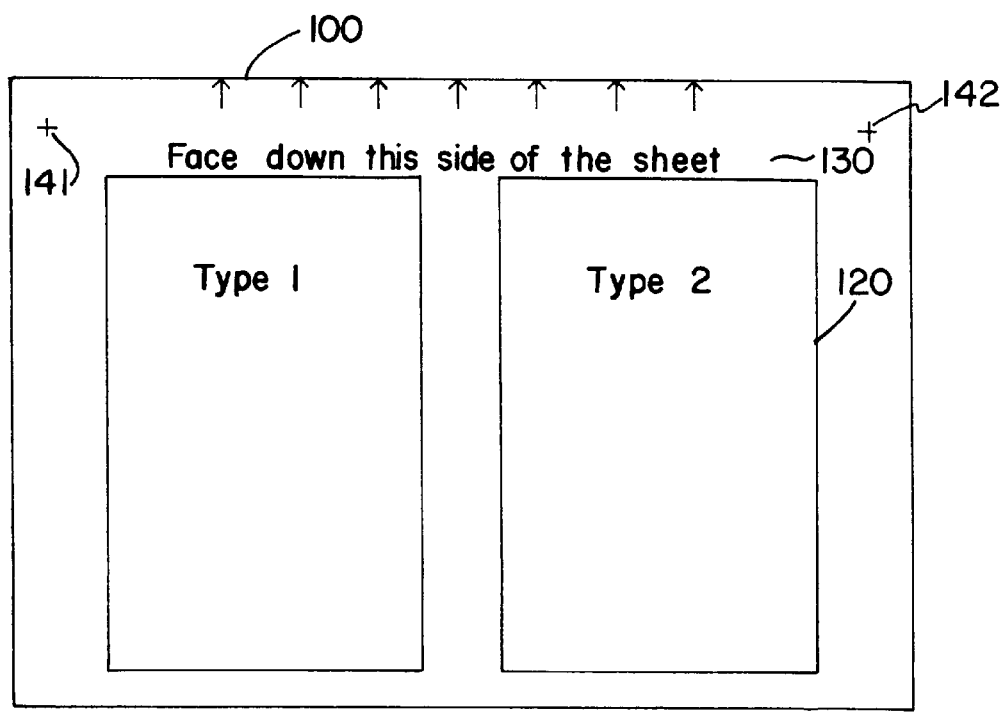

Now referring to FIG. 10B, a second preferred embodiment of the test pattern output or color patch 100 according to the current invention has two sets, Type 1, 110 and Type 2, 120 of the test patterns. Each set of the test patterns contains rows and columns of patches such as described in reference to FIG. 10A. These two sets of the patches are generated using separate sets of dithering patterns in outputting colorants onto an image-carrying medium such as a sheet of paper. Because of these multiple sets of dithering patterns, to precisely color balance the output, a color balancing process should be repeated for each set of dithering patters. In addition to the above described the orientation and position markers, the second preferred embodiment additionally includes a descriptive label 130 to indicate to an operator a desirable side of the test pattern output to be placed on the image scanning surface.

Figure 11:
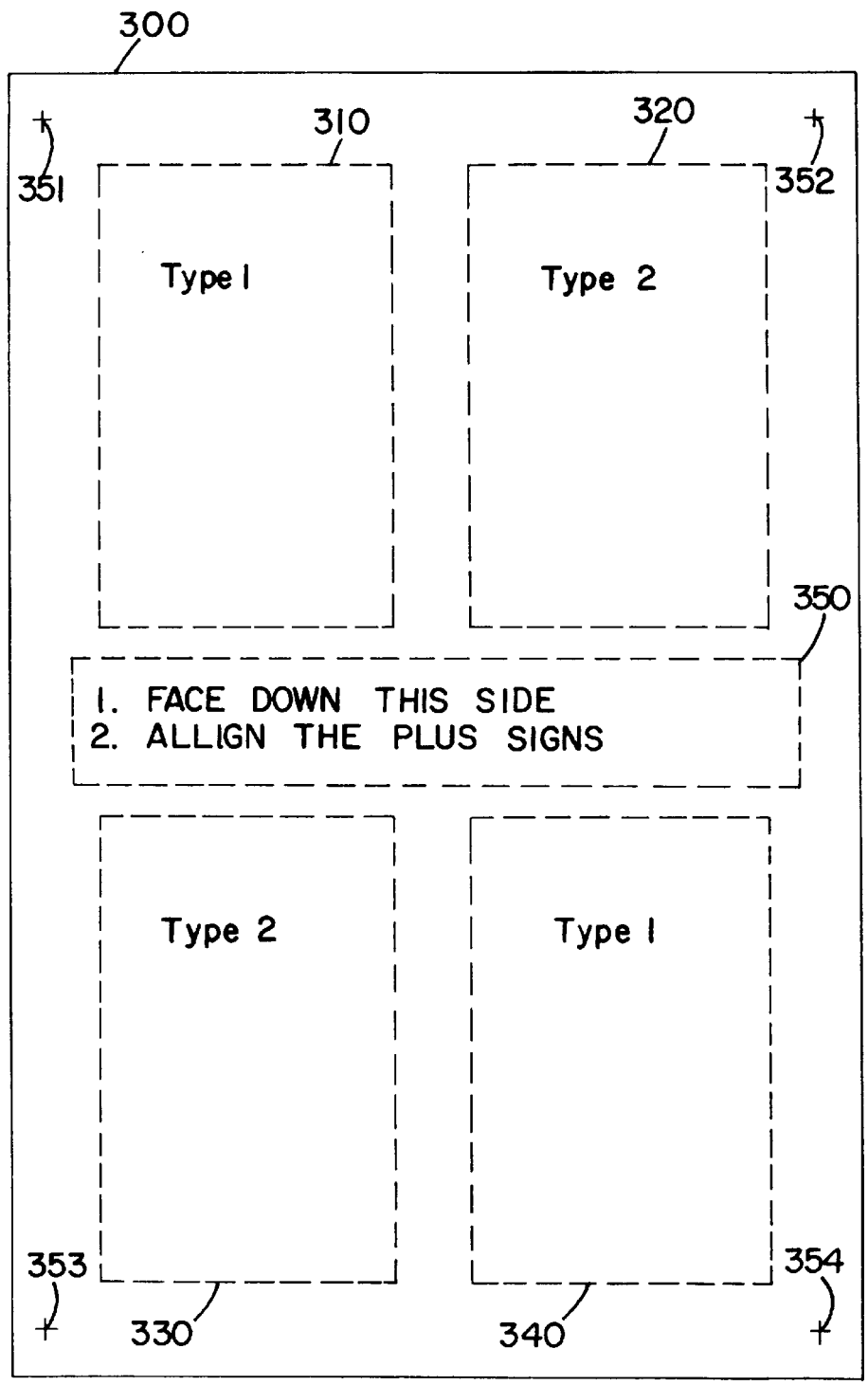
FIGS. 11 illustrates another embodiment of the test pattern output including the orientation marks according to the current invention.

Referring to FIG. 11, a third preferred embodiment of the test pattern output or color patch 300 according to the current invention is a variation of the above described second preferred embodiment. The first group of two sets Type 1, 310 and Type 2, 320 are duplicated on the other side of the sheet, and the second group of the two sets 330 and 340 are reversed as in a mirror image. Because of this arrangement, either group of the test patches on the test pattern output 300 may be placed on an image scanning surface for the purpose of color balancing. However, the test pattern output 300 still needs to be placed at a predetermined position on the image scanning surface as indicated by the plus sign position markers 351–354. The label 350 instructs the operator to face down this side and align one of the plus signs 351–354 on the image scanning surface.

Figure 12:
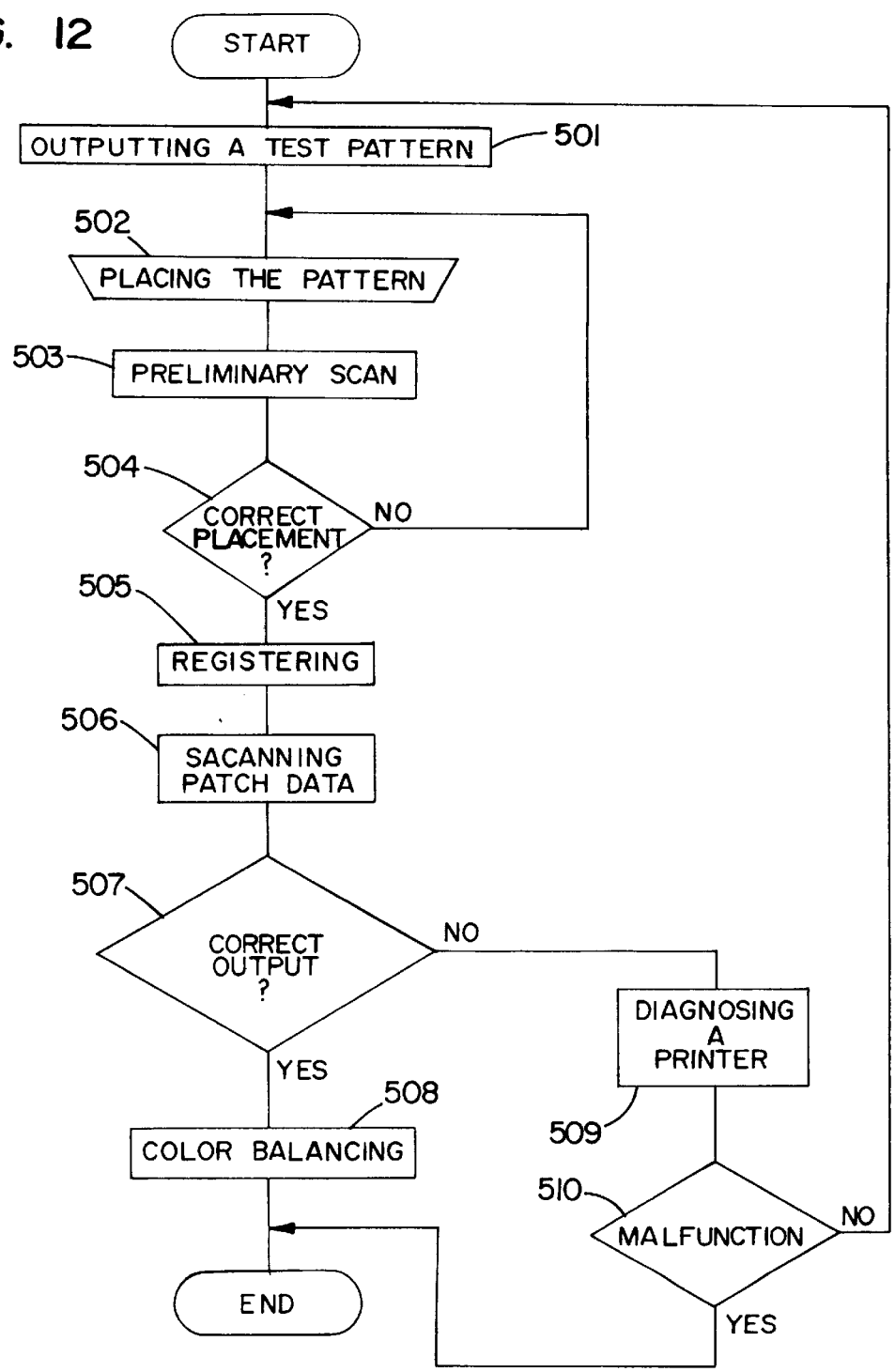
FIG. 12 is a flow chart for illustrating steps for performing the overall colorant-independent color balancing process according to the current invention.

Referring to FIG. 12, a preferred process of a colorant independent color-balancing method is shown in a flow chart according to the current invention. After a color patch or test pattern output is generated in the color balancing mode in a step 501, the color patch or test pattern output is placed on an image scanning surface in a step 502. The step 502 is accomplished by either manually placing the test pattern on the image scanning surface or automatically transferring and/or positioning the test pattern near a scanning unit. Then, the test pattern output is initially scanned for the purpose of ascertaining a predetermined position and/or orientation of the test pattern output with respect to the scanning unit in a step 503. In a subsequent step 504, based upon the preliminary scanning results, it is determined whether the placement of the test pattern output is sufficiently correct. If the placement is not acceptable, the steps 502 through 504 for the placement of the test pattern output is repeated until the placement is acceptable.

Still referring to FIG. 12, once the placement is desirable in a step 504, a registration process determines a distance to an area to be scanned in the test pattern output in a step 505 so that a correlation is made between the scanned data and the address where the scanned data is stored. After the registration process, the test pattern patches are scanned, statistically processed and stored at the registered address in a step 506. Based upon the statistical data from the step 506, it is determined whether the scanned patch data is within a predetermined value range in a step 507. If the scanned data is within the predetermined range, a color-balancing according to the current invention is performed on the scanned data in a step 508. On the other hand, if the scanned data is outside the predetermined range, the color balancing process is not performed. Instead, a predetermined diagnostic process is performed on an output unit such as a printer. Based upon by the diagnostic process, a step 510 determines whether the output unit performs according to the specification. If the output unit is not properly functioning, the color-balancing process is terminated. In contrast, if the step 510 determines that the output unit is properly functioning, the color-balancing process is repeated from the step 501.

Figure 13A:
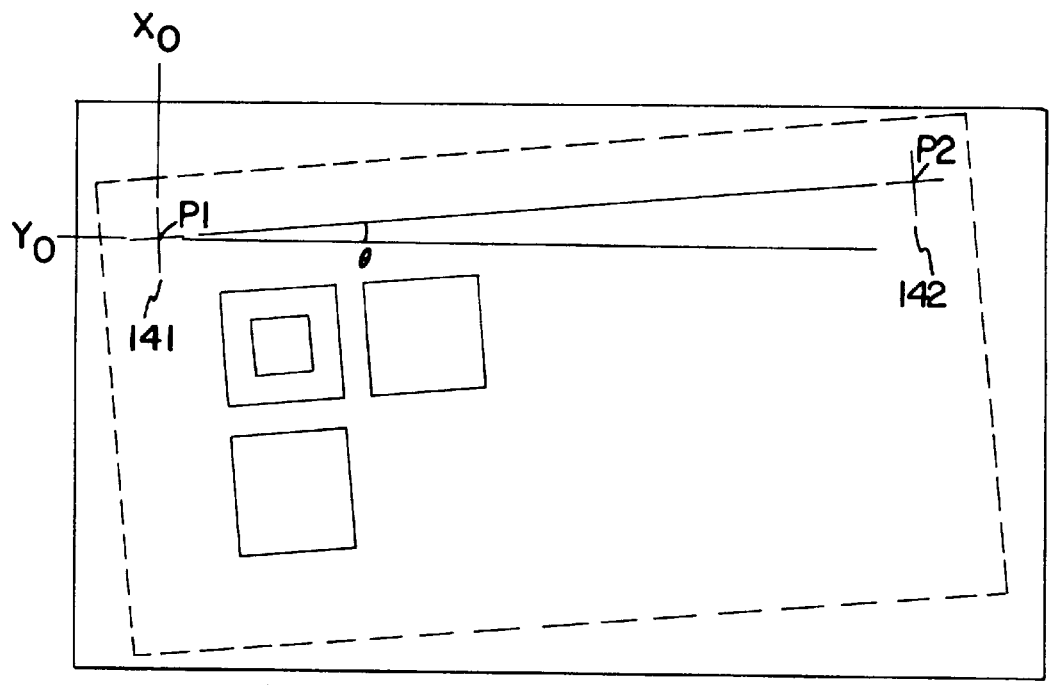
FIGS. 13A and 13B respectively illustrate how the test pattern output placed at a certain orientation and distance on an image-image scanning surface is correlated to storage locations.

Now referring to FIG. 13A, a relation between the scanned image data and the memory is conceptually illustrated. In the above described registration step 505 of FIG. 12, in order to correlate the storage address in a memory buffer and the scanned patch data, a misplacement angle θ is determined based upon the position markers 141 and 142 with respect to a predetermined horizontal line. However, if one marker alone indicates the misplacement angle, there is no need to have tow markers. If the center P1 of the position marker 141 is designated as a point $(X_0, Y_0)$, based upon the P1 position and the misplacement angle θ, data representing a certain patch is obtained at memory location addresses.

Figure 13B:
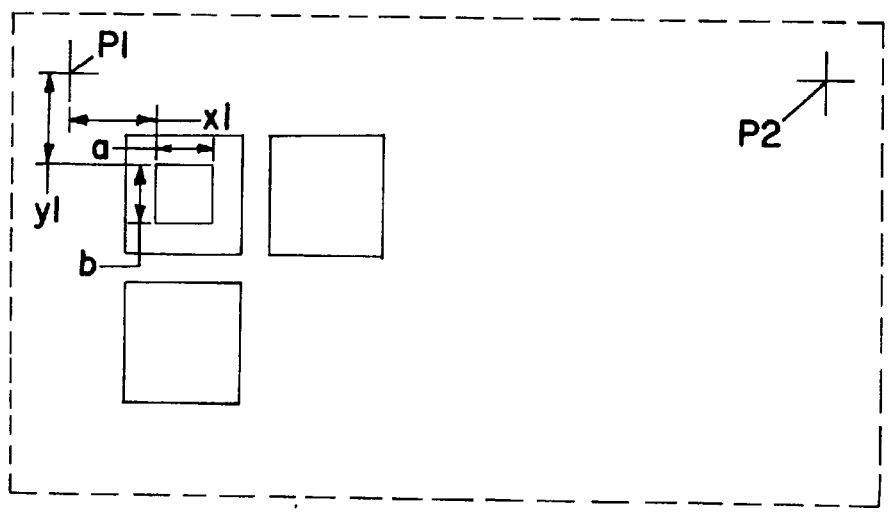

Referring to FIG. 13B, from a predetermined distance from the P1 position, a predetermined central portion of a patch is scanned. For example, a distance x1 in the horizontal direction and a distance y1 in the vertical distance from the point P1 specifies an upper left corner of the central portion of the patch to be scanned, and the size of the central portion is specified by a×b where a is the width while b is the height. The scanned data is stored at the correlated memory location.

Figure 1:
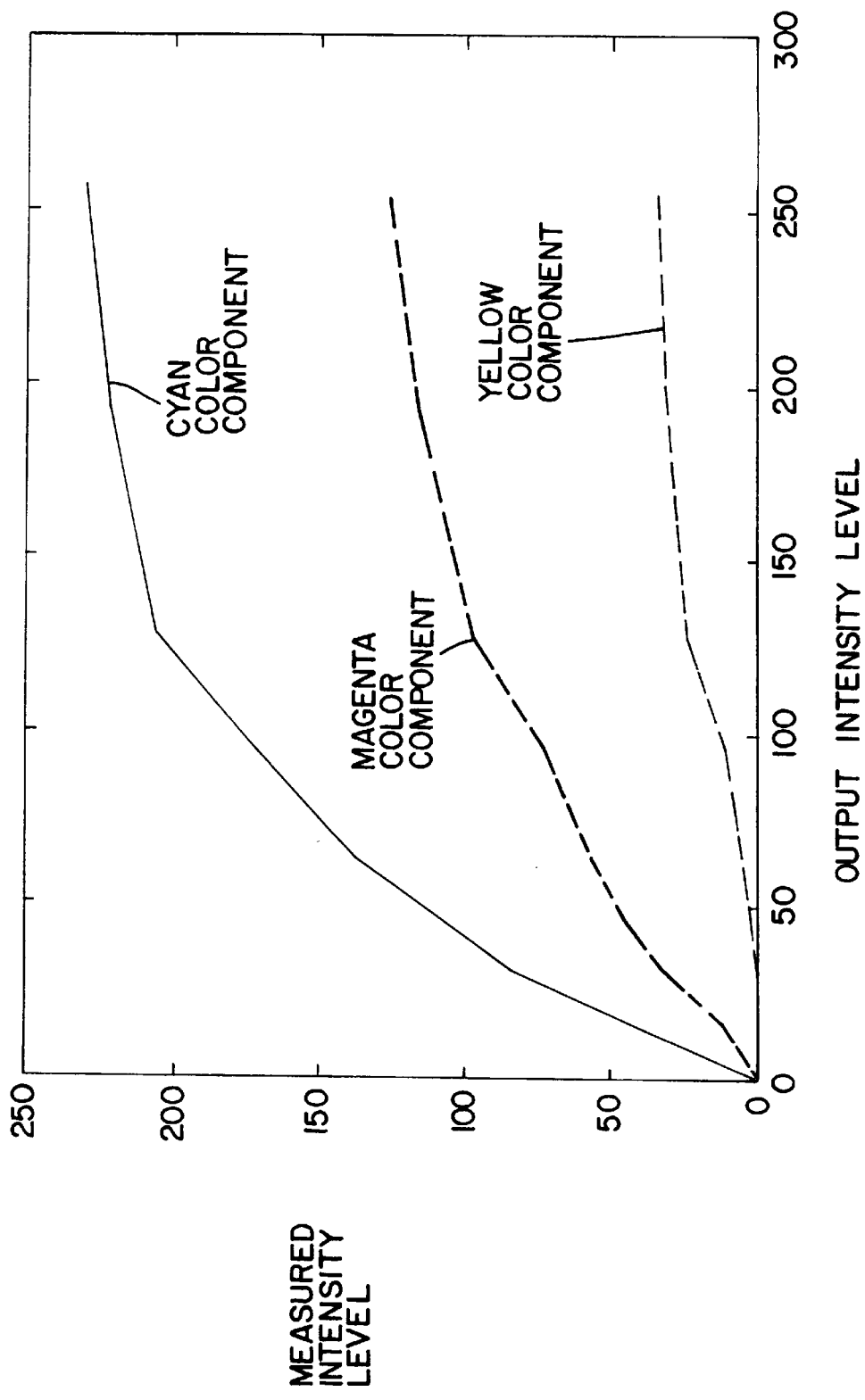
FIG. 1 is a graph illustrating the composition ratio of colorants for the cyan toner over an intensity range.
Figure 2:
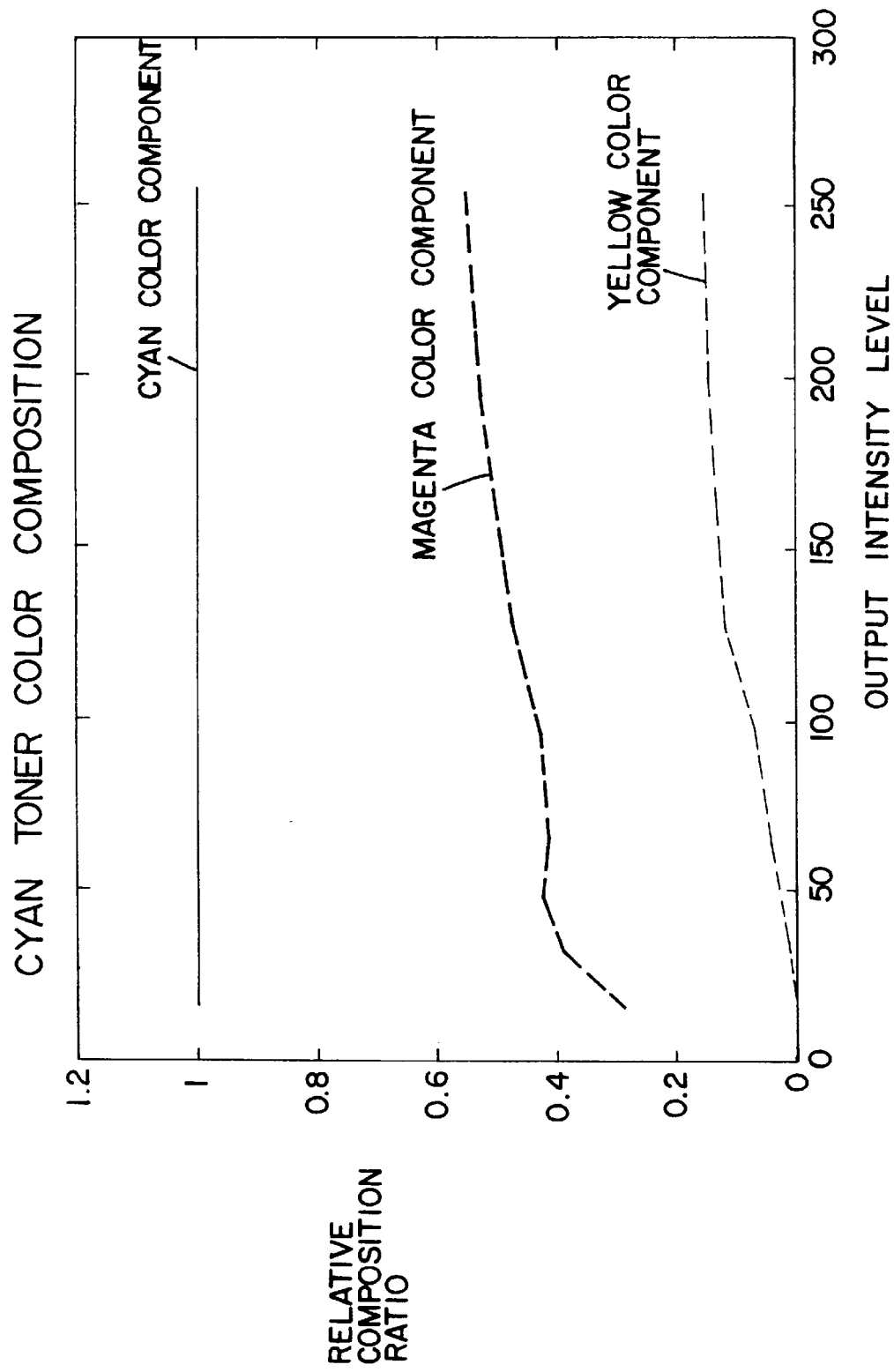
FIG. 2 is a graph illustrating the composition ratio of colorants for the magenta toner over an intensity range.
Figure 3:
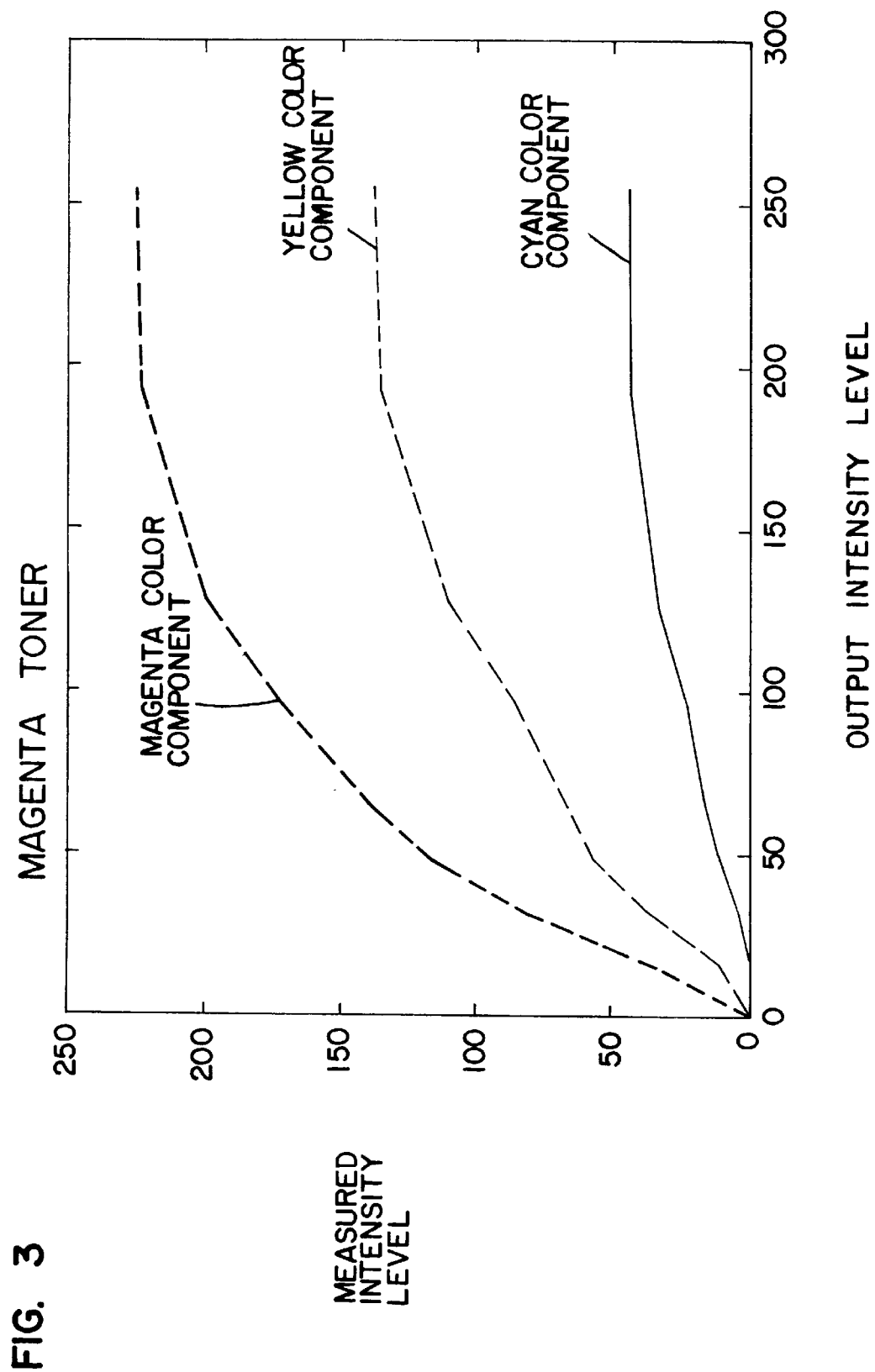
FIG. 3 is a graph illustrating the composition ratio of the cyan, magenta and yellow toner over an intensity range when the cyan toner is used as a standard level.
Figure 4:
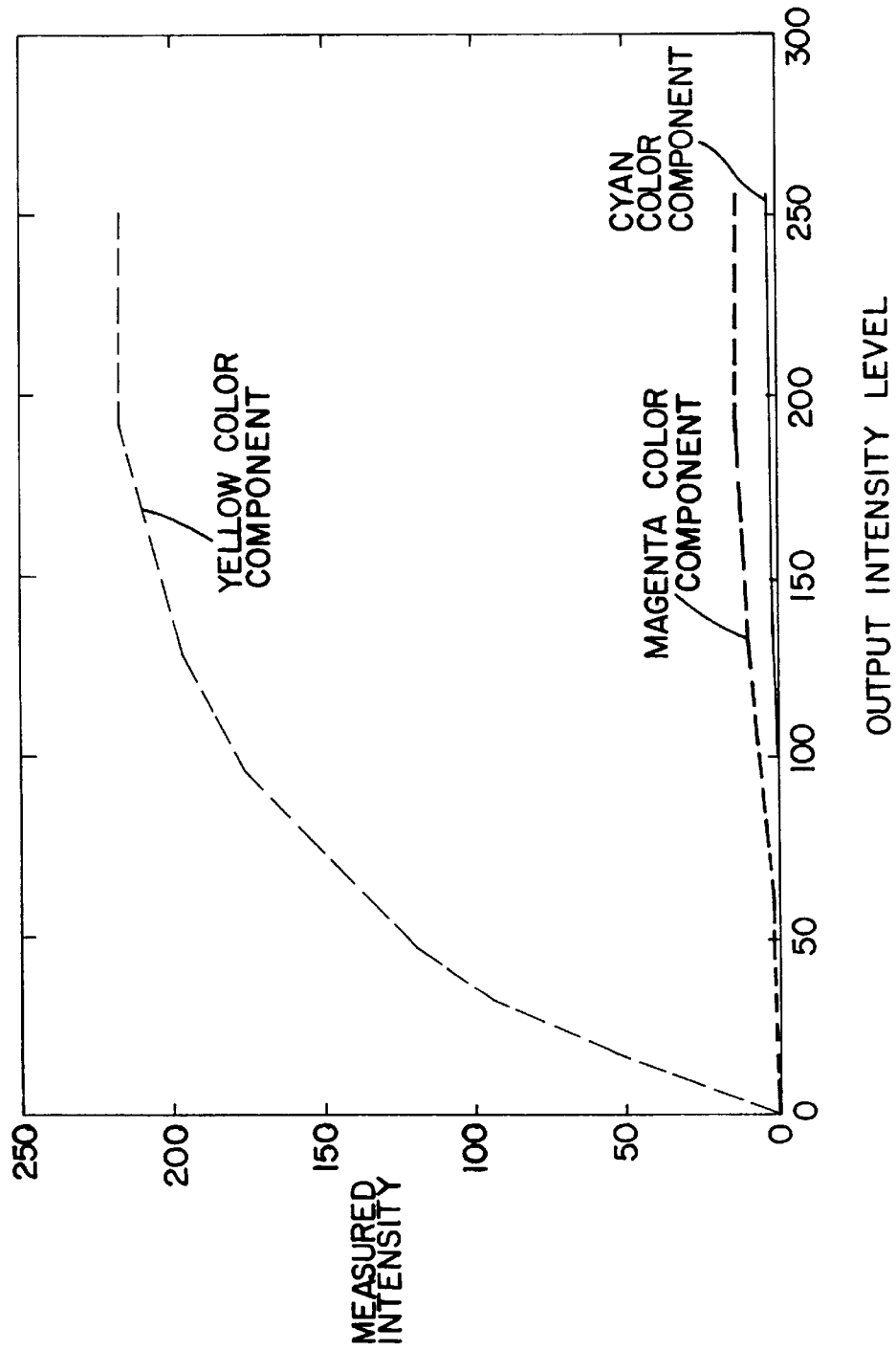
FIG. 4 is a graph illustrating the composition ratio of colorants for the yellow toner over an intensity range.
Figure 5:
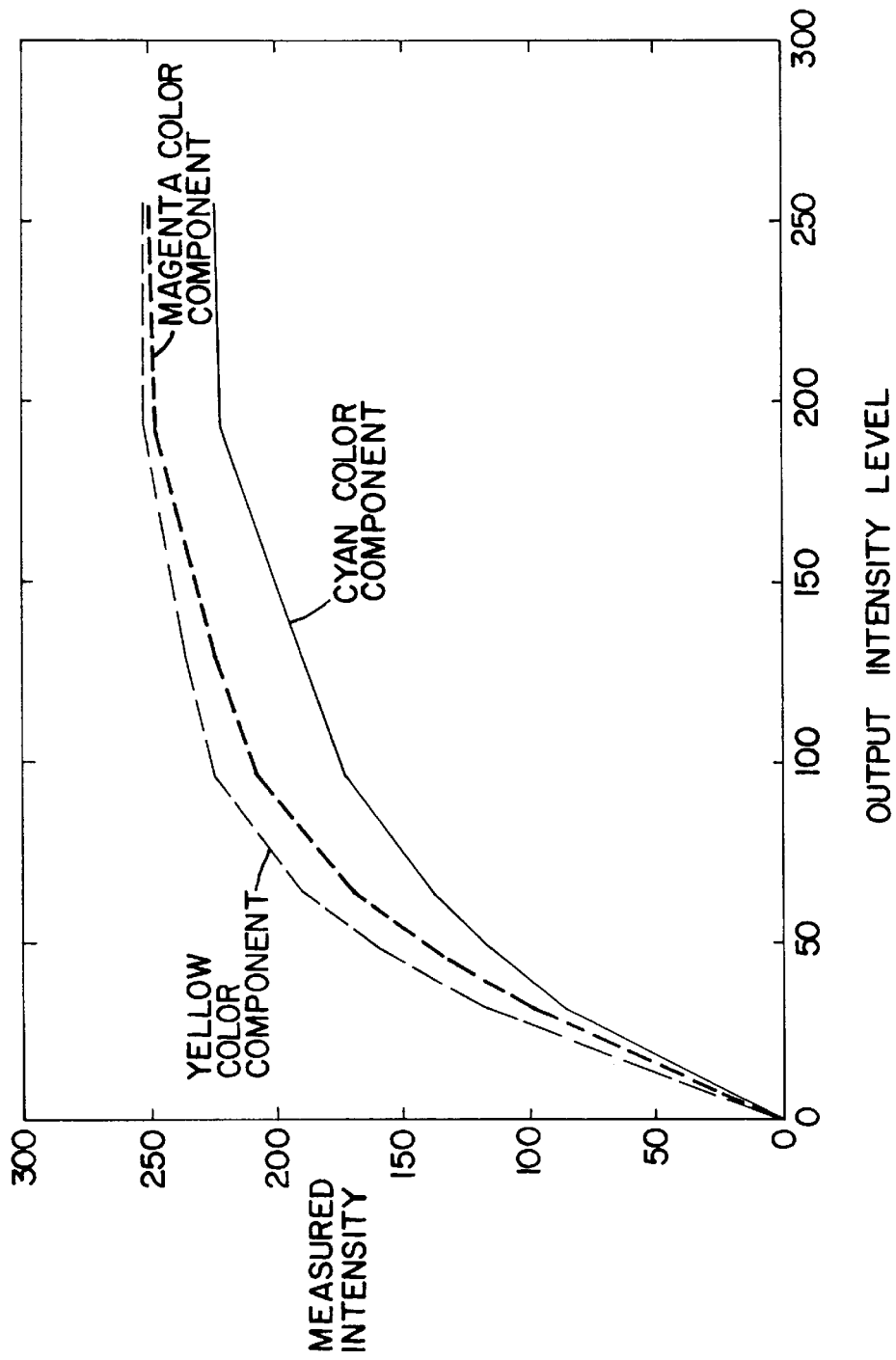
FIG. 5 is a graph illustrating the composition ratio of the cyan, magenta and yellow toner superimposed on each other over an intensity range.
Figure 14:
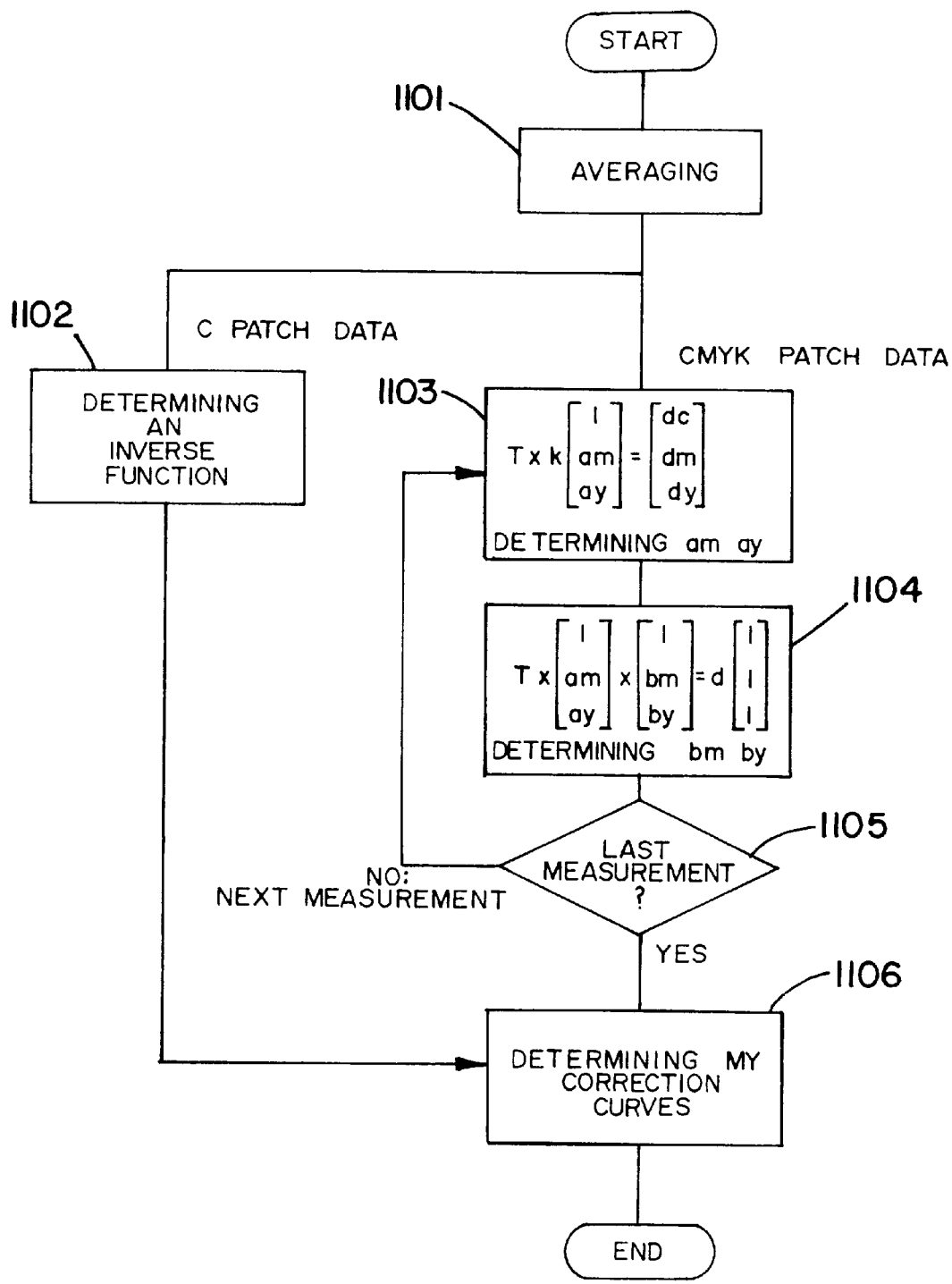
FIG. 14 is a flow chart for illustrating detailed steps of the colorant-independent color balancing process according to the current invention.

Now referring to FIG. 14, a flow chart illustrates detailed steps of the color balancing step 508 as shown in FIG. 11 in accordance with the current invention. As already described, each of the colorants such as CMY toner is not pure and includes other toner colorants as shown in FIGS. 1 through 3. In order to color balance the sequentially applied CMY toner on the image-carrying medium, according to one preferred method of the current invention, the primary colors rendered by the CMY toner are gray balanced. In other words, a predetermined color image output or a test pattern having a substantially gray is generated, and when this test pattern is inputted by an input device such as an image scanner, the RGB values are adjusted to be substantially equal (i.e. R=G=B) to be gray balanced. Similarly, the output intensity values specifying the output amount of each of the colorants are also adjusted so as to gray balance the measured CMY intensities (i.e., C=M=Y). To accomplish the gray scale balance, in general, the intensity values of colorants are respectively adjusted to meet the measured value of one selected colorant.

To express the above described color balancing process, the matrix notation is used as follows: The output intensity value for outputting each colorant as a separate test patch on an image-carrying medium is denoted by C, M and Y while the measured intensity value of each colorant on the image-carrying medium is denoted by $C_p$, $M_p$ and $Y_p$. The composition ratio of each colorant at $C_p$, $M_p$ and $Y_p$ is respectively denoted by $[c_c, m_c, y_c]$ for cyan toner, $[c_m, m_m, y_m]$ for magenta toner, and $[c_y, m_y, y_y]$ for yellow toner. Based upon the above matrices, the following relation is true.

$$\begin{bmatrix} C_p \\ M_p \\ Y_p \end{bmatrix} = \begin{bmatrix} c_c & c_m & c_y \\ m_c & m_m & m_y \\ y_c & y_m & y_y \end{bmatrix} \begin{bmatrix} C \\ M \\ Y \end{bmatrix} \quad (4)$$

An inverse matrix allows to obtain the output intensity values from the measured intensity values as follows:

$$\begin{bmatrix} C \\ M \\ Y \end{bmatrix} = \begin{bmatrix} c_c & c_m & c_y \\ m_c & m_m & m_y \\ y_c & y_m & y_y \end{bmatrix}^{-1} \begin{bmatrix} C_p \\ M_p \\ Y_p \end{bmatrix} \quad (5)$$

In general, the color balancing according to the current invention is to obtain certain parameters or coefficients to allow the above inverse matrix conversion. The above described relation is true for the single color toner patch, but the triple layered patches such as 3 K's as shown in FIG. 10A require further processing.

Still referring to FIG. 14, according to one preferred process, the cyan is defined as a standard colorant. This is because the cyan output generally has the least measured intensity value and it is technically easier to reduce the output toner amount of other colorants towards the least value within a dynamic range. After a predetermined number of test pattern patches has been scanned, the scanned data is averaged in a step 1101. For a cyan test pattern patches, in a step 1102, an inverse function is determined from its characteristic curve for the future use.

The CMY toner are sequentially applied in a predetermined order. For example, the yellow toner is applied first on an image-carrying medium surface, and magenta is applied on top of yellow. Lastly, cyan is applied on top of magenta. In this example, the cyan toner partially blocks light transmittance to other toner. Because of this masking effect, for the M and Y colorants, masking factor coefficients $a_m$ and $a_y$ are determined in the step 1103 using the following equation:

$$\begin{bmatrix} c_{c0} & c_{m0} & c_{y0} \\ m_{c0} & m_{m0} & m_{y0} \\ y_{c0} & y_{m0} & y_{y0} \end{bmatrix} \begin{bmatrix} 1 \\ a_m \\ a_y \end{bmatrix} = h \begin{bmatrix} c_0 \\ m_0 \\ y_0 \end{bmatrix} \quad (6)$$

where $c_0$, $m_0$ and $y_0$ respectively represent the measured intensity value of each colorant for the triple layered patch which was outputted at the output intensity values of $C_0$, $M_0$ and $Y_0$ and the values of $C_0$, $M_0$ and $Y_0$ are equal (i.e., $C_0 = M_0 = Y_0$). $c_{c0}$, $m_{c0}$ and $y_{c0}$ represent the measured intensity values of the cyan single patch which is generated at the above same output intensity value $C_0$, $M_0$ and $Y_0$. Similarly, $c_{m0}$, $m_{m0}$ and $Y_{m0}$ represent the measured intensity values of the magenta single patch which is generated at the above same output intensity value $C_0$, $M_0$ and $Y_0$. Lastly, $c_{y0}$, $m_{y0}$ and $y_{y0}$ represent the measured intensity values of the yellow single patch which is generated at the above same output intensity value $C_0$, $M_0$ and $Y_0$. h is a predetermined coefficient. Although the single patches are used to for the measured intensity values, for the practical purposes, the same masking coefficients am and ay are used for the triple layered toner application.

In a step 1104, based upon the above determined masking factor coefficients am and ay, the gray scale correction factors or the gray balance coefficients $b_m$ and $b_y$ are determined by as follows:

$$\begin{bmatrix} c_{c0} & c_{m0} \cdot a_m & c_{y0} \cdot a_y \\ m_{c0} & m_{m0} \cdot a_m & m_{y0} \cdot a_y \\ y_{c0} & y_{m0} \cdot a_m & y_{y0} \cdot a_y \end{bmatrix} \begin{bmatrix} 1 \\ b_m \\ b_y \end{bmatrix} = k \begin{bmatrix} g_c \\ g_m \\ g_y \end{bmatrix} \quad (7)$$

where $g_c$, $g_m$ and $g_y$ have the ratio of 1:1:1. In other words, the gray scale correction factors $b_m$ and $b_y$ are the ratios of the true output intensity values in order to generate a gray balanced color which take the above described masking effect into account.

Using the above determined gray balance coefficients $b_m$ and $b_y$, the parameters for the conversion equations (4) and (5) are expressed as follows:

$$\begin{bmatrix} c_c & c_m & c_y \\ m_c & m_m & m_y \\ y_c & y_m & y_y \end{bmatrix} = \begin{bmatrix} c_{c0} & c_{m0} & c_{y0} \\ m_{c0} & m_{m0} & m_{y0} \\ y_{c0} & y_{m0} & y_{y0} \end{bmatrix} \begin{bmatrix} 1 \\ b_m \\ b_y \end{bmatrix} \quad (9)$$

Alternatively, the parameters may be expressed in the following two step approach:

$$\begin{bmatrix} c_c & c_m & c_y \\ m_c & m_m & m_y \\ y_c & y_m & y_y \end{bmatrix} = \begin{bmatrix} c_{c0} & c_{m0} & c_{y0} \\ m_{c0} & m_{m0} & m_{y0} \\ y_{c0} & y_{m0} & y_{y0} \end{bmatrix} \quad (10)$$

Substituting the equation (10) into the equation (5), the output intensity values C, M and Y are designated to be C', M' and Y'. Now substituting the C', M' and Y' values into the following equation:

$$\begin{bmatrix} c \\ M \\ Y \end{bmatrix} = \begin{bmatrix} 1 & 0 & 0 \\ 0 & 1/b_m & 0 \\ 0 & 0 & 1/b_y \end{bmatrix} \begin{bmatrix} C' \\ M' \\ Y' \end{bmatrix} \quad (11)$$

According to a preferred embodiment, the above described steps 1103 and 1104 are repeated for every measurement as shown in a step 1105. For example, the measurements include the output intensity values at 8, 16, 32, 48, 64, 96, 128, 196 and 255. In other words, the separate pairs of values for the gray scale correction factors $b_m$ and $b_y$ are determined over an entire non-saturated range by repeating at a plurality of measurements. On the other hand, according to an alternative process of the current invention, only one representative measurement is taken at the output intensity value such as 196 in a non-saturated region, and the repetition step 1105 is not necessary. In the single measurement method, the same value of the gray scale correction factors $b_m$ and $b_y$ is used for the entire range. Although the preferred embodiment requires a larger amount of data and processing, the preferred embodiment more accurately color balances the colorants on the image-carrying medium than the above alternative embodiment.

According to a second alternative embodiment of the current invention, a single set of the gray scale correction factors $b_m$ and $b_y$ is also used. The same gray scale correction factors $b_m$ and $b_y$ are used in the above equations (4) and (5) over a range of the output intensity, and a single set of the output intensity values C", M" and Y" is obtained. Then, the output intensity values C", M" and Y" are modified by a predetermined pair of variation coefficients $\beta_m$ and $\beta_y$ over the output intensity range to obtain the corrected color balanced output intensity values C, M and Y as shown in the following equation.

$$\begin{bmatrix} C \\ M \\ Y \end{bmatrix} = \begin{bmatrix} 1 & 0 & 0 \\ 0 & \beta m & 0 \\ 0 & 0 & \beta y \end{bmatrix} \begin{bmatrix} C'' \\ M'' \\ Y'' \end{bmatrix} \quad (12)$$

The variation coefficients $\beta_m$ and $\beta_y$ are determined based upon the assumption that only the gray scale correction factors $b_m$ and $b_y$ change over the output intensity range and the variation coefficients $\beta_m$ and $\beta_y$ represent the ration in relation to the single set of the originally obtained gray scale correction factors $b_m$ and $b_y$.

Finally, in a step 1106, the color balancing curves for the magenta and yellow toner are obtained. As described above, the inverse function of the cyan toner characteristic curve is prepared in the step 1102. This inverse function is now respectively multiplied by the gray scale correction factors $b_m$ and $b_y$ in order to obtain a color balanced output intensity curve for the magenta toner and the yellow toner. Based upon the color balanced output intensity curves, the color balanced output intensity values are now available to generate the color balanced image on the image-carrying medium. For the black toner output intensity values, the cyan toner output intensity values are used. Although the color balanced curves are substantially linear for indicating the output intensity values, for the purposes of fine tuning a specific area such as a highlight, middle and shadow area, a predetermined specific correction curve is alternatively used.

Figure 15:
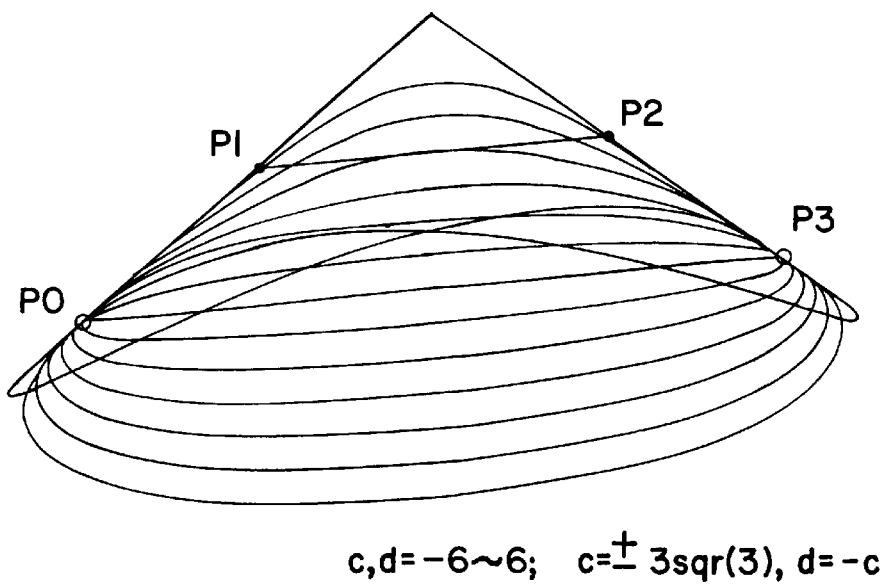
FIG. 15 illustrates how Modified Bezier curves may be used.

One example of the specific curve includes a Modified Bezier (MB) curve as described in Japanese Patent Publication 2-222264. The MB curve is generally expressed by the following curve:

$$MB(t)=P_0(1-t)^3+\{cP_1-(c-3)P_0\}(1-t)^{2t}+\{dP_2-(d-3)P_3\}(1-t)t^2+P_3t^3 \quad (13)$$

where $P_0$ is a starting point, $P_1$ is a first control point, $P_2$ is a second control point, and $P_3$ is an ending point. c and d are a first and second control parameters. Referring to FIG. 15, one exemplary set of the MB curves is illustrated. In general, as the value of the control parameters c and d increases with the same set of control points $P_0$ thorough $P_3$, the MB curves have a large degree of curvature. In contrast, as the value of the control parameters c and d decreases with the same set of control points $P_0$ thorough $P_3$, the MB curves have a smaller degree of curvature. In addition, the value of the control parameters c and d may be positive or negative to determine a particular direction and shape of a desired curve.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of color balancing a color image output on an image-carrying medium, the color image output being generated by colorants each respectively rendering a predetermined primary color, at least a first colorant being placed over a second colorant on the image-carrying medium, each of the colorants being a mixture of the colorants, comprising the steps of:

a) approximating a standard gray scale value for one of the colorants based upon a predetermined inverse function at a specified intensity, said one of the colorants being defined as a standard colorant;

b) determining a masking factor of said standard colorant for each of other colorants, said masking factor indicating an amount of masking by said standard colorant which affects said other colorants located beneath said standard colorant in the color image output on the image-carrying medium; and c) determining a gray scale correction factor for each of said other colorants based upon said corresponding masking factor and said approximated gray scale value, said gray scale correction factor indicating an amount for adjusting each of said other colorants so as to converge on said standard gray scale value whereby the color image output is color balanced at said specified value.

2. The method of color balancing a color image output on an image-carrying medium according to claim 1 wherein said colorants include cyan rendering material, magenta rendering material, yellow rendering material and black rendering material.

3. The method of color balancing a color image output on an image-carrying medium according to claim 2 wherein said standard colorant is said cyan rendering material.

4. The method of color balancing a color image output on an image-carrying medium according to claim 3 wherein said colorants are ink.

5. The method of color balancing a color image output on an image-carrying medium according to claim 3 wherein said colorants are toner.

6. The method of color balancing a color image output on an image-carrying medium according to claim 1 wherein said step a) further comprises additional steps of:

i) selecting one of the colorants;

ii) specifying an intensity value for outputting said selected colorant onto the image-carrying medium; and iii) measuring a color composition of said outputted colorant at said intensity value.

7. The method of color balancing a color image output on an image-carrying medium according to claim 6 wherein said steps i)through iii) are repeated for a range of intensity values and each of said colorants.

8. The method of color balancing a color image output on an image-carrying medium according to claim 6 wherein said measured color composition is stored in a matrix form.

9. A method of manually color balancing a color image output of an image-duplicating device, the color image output being generated by colorants each respectively rendering a predetermined color, at least a first colorant being placed over a second colorant on an image-carrying medium, each of the colorants being a mixture of the colorants, comprising the steps of:

a) selecting a color balancing mode to cause the image-duplicating device to generate on the image-carrying medium a predetermined test pattern output which includes an orientation mark for indicating a predetermined orientation of said predetermined test pattern output;

b) placing said predetermined test pattern output on a predetermined image scanning surface according to said orientation mark;

c) activating an automatic color balancing process, said automatic color balancing process further including the following steps of:

i) approximating a standard gray scale value for one of the colorants based upon a predetermined inverse function at a specified intensity, said one of the colorants being defined as a standard colorant;

ii) determining a masking factor of said standard colorant for each of other colorants said masking factor indicating an amount of masking by said standard colorant which affects said other colorants located beneath said standard colorant in the color image output on the image-carrying medium; and iii) determining a gray scale correction factor for each of said other colorants based upon said corresponding masking factor and said approximated gray scale value, said ray scale correction factor indicating an amount for adjusting each of said other colorants so as to converge on said standard gay scale value whereby the color image output is color balanced at said specified value, wherein said automatic color balancing process color balances the colorants on the image-carrying medium.

10. The method of manually color balancing a color image output of an image-duplicating device according to claim 9 further comprises an additional step d) prior to said step a), said step d) indicating an off color balance status.

11. The method of manually color balancing a color image output of an image-duplicating device according to claim 10 wherein said step d) additionally includes a step e) of providing information on a color balancing procedure of the image-duplicating device.

12. The method of manually color balancing a color image output of an image-duplicating device according to claim 11 wherein said step e) shuts off the image-duplicating device when said color balancing procedure is not performed.

13. The method of manually color balancing a color image output of an image-duplicating device according to claim 9 wherein said step b) further comprising the following steps of:
   f) scanning said test pattern output;
   g) determining whether said test pattern output is placed substantially at said predetermined orientation with respect to said image-scanning surface based upon said orientation mark;
   h) determining whether said orientation mark is placed substantially close to a predetermined location on said image-scanning surface;
   i) determining whether said test pattern output substantially conforms with a predetermined range of output values; and
   j) displaying a corresponding warning message based upon said steps g), h) and i).

14. The method of manually color balancing a color image output of an image-duplicating device according to claim 13 further comprising a step k) of repositioning said test pattern output to correct inaccurate placement of the image-carrying medium on said image-scanning surface based upon said steps g) and h).

15. A method of automatically color balancing a color image output of an image-duplicating device, the color output being generated by colorants each respectively rendering a predetermined primary color, at least a first colorant being placed over a second colorant on an image-carrying medium, each of the colorants being a mixture of the colorants, comprising the steps of:
   a) automatically activating a color balancing mode to cause the image-duplicating device to generate a predetermined test pattern output on the image-carrying medium;
   b) scanning said predetermined test pattern output on the image-carrying medium inside the image-duplicating device prior to dispensing the image-carrying medium, said step b) generating a scanned test pattern signal;
   c) performing a color balancing process on the colorants based upon said scanned test pattern signal, said color balancing process further including the following steps of:
      i) approximating a standard gray scale value for one of the colorants based upon a predetermined inverse function at a specified intensity said one of the colorants being defined as a standard colorant:
      ii) determining a masking factor of said standard colorant for each of other colorants, said masking factor indicating an amount of masking by said standard colorant which affects said other colorants located beneath said standard colorant in the color image output on the image-carrying medium; and
      iii) determining a gray scale correction factor for each of said other colorants based upon said corresponding masking factor and said approximated gay scale value, said gray scale correction factor indicating an amount for adjusting each of said other colorants so as to converge on said standard gray scale value whereby the color image output is color balanced at said specified value.

16. The method of automatically color balancing a color image output of an image-duplicating device according to claim 15 further comprising an additional step d) prior to said step a), said step d) detecting an off color balance status.

17. The method of automatically color balancing a color image output of an image-duplicating device according to claim 16 further comprising additional steps d) and e) prior to said step a), said step d) counting a number of the color image outputs, said step e) comparing said number to a predetermined number so as to determine if said step a) is performed.

18. The method of automatically color balancing a color image output of an image-duplicating device according to claim 15 wherein said step c) additionally includes a step f) of indicating that said color balancing process is currently being performed.

19. The method of automatically color balancing a color image output of an image-duplicating device according to claim 18 wherein said step f) disables a normal duplicating operation of the image-duplicating device during said color balancing process.

20. The method of automatically color balancing a color image output of an image-duplicating device according to claim 15 wherein said step b) further comprising the following steps of:
   g) determining whether said test pattern output substantially conforms with a predetermined range of output values; and
   h) displaying a corresponding warning message based upon said step g).

21. The method of automatically color balancing a color image output of an image-duplicating device according to claim 15 wherein said step b) further comprises an additional step i) of positioning said test pattern output at a predetermined scanning path at a predetermined orientation.

22. A system for color balancing a color image output on an image-carrying medium, the color image output being generated by colorants each respectively rendering a predetermined primary color, at least a first colorant being placed over a second colorant on the image-carrying medium, each of the colorants being a mixture of the colorants, comprising:
   a standard gray scale value approximating unit for approximating a standard gray scale value for one of the colorants based upon a predetermined inverse function at a specified intensity, said one of the colorants being defined as a standard primary colorant;
   a masking value determining unit for determining a masking factor of said standard colorant for each of said other colorants, said masking factor indicating an amount of masking by said standard colorant which affects said other colorants located beneath said standard colorant in the color image output on the image-carrying medium; and a correction factor determining unit for determining a gray scale correction factor for each of said other colorants based upon said masking factor and said approximated gray scale value for color balancing said other primary colorants, said gray scale correction factor indicating an amount for adjusting each of said other colorants so as to converge on said standard gray scale value whereby the color image output is color balanced at said specified value.

23. The system for color balancing a color image output on an image-carrying medium according to claim 22 wherein said colorants include cyan rendering material, magenta rendering material, yellow rendering material and black rendering material.

24. The system for color balancing a color image output on an image-carrying medium according to claim 23 wherein said standard primary colorant is said cyan rendering material.

25. The system for color balancing a color image output on an image-carrying medium according to claim 24 wherein said primary colorants are ink.

26. The system for color balancing a color image output on an image-carrying medium according to claim 24 wherein said primary colorants are toner.

27. The system for color balancing a color image output on an image-carrying medium according to claim 22 wherein said standard gray scale value approximating unit performs the following steps of:
   i) selecting one of the colorants;
   ii) specifying an intensity value indicative of an amount of said selected colorant to be outputted onto the image-carrying medium; and
   iii) measuring a color composition of said outputted colorant at said intensity.

28. The system for color balancing a color image output on an image-carrying medium according to claim 27 wherein said a standard gray scale value approximating unit repeats said steps i)through iii) for a range of intensity values and each of said colorants.

29. The system for color balancing a color image output on an image-carrying medium according to claim 27 wherein said standard gray scale value approximating unit stores information on said measured color composition in a matrix form.

30. A system for manually color balancing a color image output of an image-duplicating device, the color image output being generated by colorants each respectively rendering a predetermined primary color, at least a first colorant being placed over a second primary colorant on an image-carrying medium, each of the colorants being a mixture of the colorants, comprising:
   a manual mode switch for selecting a color balancing mode;
   a test pattern generating unit connected to said mode switch for generating on the image-carrying medium a predetermined test pattern output which includes an orientation mark for indicating a predetermined orientation;
   an image scanning surface for scanning said predetermined test pattern output according to said predetermined orientation as indicated by said orientation mark;
   a color balance activation switch for activating an automatic color balancing process; and
   a color balancing unit connected to said color balance activation switch for color balancing the colorants on the image-carrying medium said color balancing unit further comprising:
      a standard gay scale value approximating unit for approximating a standard gray scale value for one of the colorants based upon a predetermined inverse function at a specified intensity said one of the colorants being defined as a standard primary colorant;
      a masking value determining unit for determining a masking factor of said standard colorant for each of said other colorants said masking factor indicating an amount of masking by said standard colorant which affects said other colorants located beneath said standard colorant in the color image output on the image-carrying medium; and
      a correction factor determining unit for determining a gray scale correction factor for each of said other colorants based upon said masking factor and said approximated gray scale value for color balancing said other primary colorants, said gray scale correction factor indicating an amount for adjusting each of said other colorants so as to converge on said standard gay scale value whereby the color image output is color balanced at said specified value.

31. The system for manually color balancing a color image output of an image-duplicating device according to claim 30 further comprises an off color balance detecting unit for detecting an off color balance status and an off color balance indicator connected to said off color balance detecting unit for displaying said off color balance status.

32. The system for manually color balancing a color image output of an image-duplicating device according to claim 31 wherein said off color balance detecting unit further includes a counter connected to said off color balance detecting unit for counting a number of color image outputs duplicated by the image-duplicating device after said off color balance status is detected; and a shut off unit connected to said counter and said color balance activation switch for shutting off the image-duplicating device when said predetermined number of the color image outputs is duplicated.

33. The system for manually color balancing a color image output of an image-duplicating device according to claim 30 wherein said color balancing unit further comprises:
   a scanner having an image-scanning surface for scanning said test pattern output which is manually placed on said image-scanning surface, said scanner generating a scanned signal;
   a placement detection unit for determining whether said test pattern output is placed substantially according to said predetermined orientation with respect to said image-scanning surface based upon said orientation mark and for determining whether said orientation mark is placed substantially close to a predetermined location on said image-scanning surface;
   an output analysis unit connected to scanner for determining whether said scanned signal is within a predetermined range; and
   an error indicator connected to said placement detection unit and said output analysis unit for displaying a corresponding warning message.

34. A system for automatically color balancing a color image output of an image-duplicating device, the color image output being generated by colorants each respectively rendering a predetermined primary color, at least a first colorant being placed over a second colorant on an image-carrying medium, each of the primary colorants being a mixture of the colorants, comprising:
   an off color balance detection unit for automatically detecting an off color balance status and for activating a color balancing mode;

a test pattern generating unit connected to said off color balance detection unit for generating a predetermined test pattern output on the image-carrying medium;

a first scanner for scanning said predetermined test pattern output on the image-carrying medium inside the image-duplicating device prior to dispensing the image-carrying medium, said first scanner generating a scanned test pattern signal; and a color balancing unit connected to said first scanner for performing a color balancing process on the colorants based upon said scanned test pattern signal, said color balancing unit further comprising:

- a standard gray scale value approximating unit for approximating a standard gay scale value for one of the colorants based upon a predetermined inverse function at a specified intensity, said one of the colorants being defined as a standard primary colorant;
- a masking value determining unit for determining a masking factor of said standard colorant for each of said other colorants, said masking factor indicating an amount of masking by said standard colorant which affects said other colorants located beneath said standard colorant in the color image output on the image-carrying medium; and
- a correction factor determining unit for determining a gray scale correction factor for each of said other colorants based upon said masking factor and said approximated gray scale value for color balancing said other primary colorants, said gray scale correction factor indicating an amount for adjusting each of said other colorants so as to converge on said standard gay scale value whereby the color image output is color balanced at said specified value.

35. The system for automatically color balancing a color image output of an image-duplicating device according to claim 34 wherein said off color balance detection unit further includes a counter for counting a number of the color image outputs after said off color balance status is detected; and a comparator connected to said counter for comparing said number to a predetermined number to determine an off color balance status.

36. The system for automatically color balancing a color image output of an image-duplicating device according to claim 34 further comprising a disabling unit connected to said off color balance detection unit for disabling a normal duplicating operation of the image-duplicating device.

37. The system for automatically color balancing a color image output of an image-duplicating device according to claim 34 further comprising:

an output analysis unit connected to said first scanner for determining whether said scanned test pattern output signal is substantially within a predetermined range; and an error indicator connected to said output analysis unit for displaying a warning message.

38. The system for automatically color balancing a color image output of an image-duplicating device according to claim 34 wherein said first scanner also scans an original color image input for generating the color image output during a normal image duplicating process of the image-duplicating device.

39. The system for automatically color balancing a color image output of an image-duplicating device according to claim 38 further comprising a test pattern transferring unit for transferring said test pattern output towards said first scanner.

40. The system for automatically color balancing a color image output of an image-duplicating device according to claim 34 further comprising a second scanner for scanning an original color image input for generating the color image output during a normal image duplicating process of the image-duplicating device.

* * * * *